United States Patent
Wang et al.

(10) Patent No.: US 11,940,349 B2
(45) Date of Patent: Mar. 26, 2024

(54) PLANE GRATING CALIBRATION SYSTEM

(71) Applicants: TSINGHUA UNIVERSITY, Beijing (CN); BEIJING U-PRECISION TECH CO., LTD., Beijing (CN)

(72) Inventors: Leijie Wang, Beijing (CN); Ming Zhang, Beijing (CN); Yu Zhu, Beijing (CN); Jiankun Hao, Beijing (CN); Xin Li, Beijing (CN); Rong Cheng, Beijing (CN); Kaiming Yang, Beijing (CN); Jinchun Hu, Beijing (CN)

(73) Assignees: TSINGHUA UNIVERSITY, Beijing (CN); BEIJING U-PRECISION TECH CO., LTD., Beijing (CN)

( * ) Notice: Subject to any disclaimer, the term of this patent is extended or adjusted under 35 U.S.C. 154(b) by 314 days.

(21) Appl. No.: 17/610,730

(22) PCT Filed: May 13, 2020

(86) PCT No.: PCT/CN2020/089949
§ 371 (c)(1),
(2) Date: Nov. 12, 2021

(87) PCT Pub. No.: WO2020/228720
PCT Pub. Date: Nov. 19, 2020

(65) Prior Publication Data
US 2022/0260452 A1     Aug. 18, 2022

(30) Foreign Application Priority Data
May 16, 2019     (CN) .......................... 201910405697.3

(51) Int. Cl.
*G01M 11/02*     (2006.01)
*G01M 11/04*     (2006.01)
(Continued)

(52) U.S. Cl.
CPC ........ *G01M 11/0214* (2013.01); *G01M 11/04* (2013.01); *G02B 5/1857* (2013.01);
(Continued)

(58) Field of Classification Search
CPC ............. G01M 11/0214; G01M 11/04; G01M 11/0207; G02B 5/1857; G02B 7/003;
(Continued)

(56) References Cited

U.S. PATENT DOCUMENTS 5,076,693 A     12/1991 Teramoto
6,882,477 B1     4/2005 Schattenburg et al.
(Continued)

FOREIGN PATENT DOCUMENTS

CN     103176372 A     6/2013
CN     103513254 A     1/2014
(Continued)

OTHER PUBLICATIONS

International Search Report from International Application No. PCT/CN2020/089949 dated Aug. 13, 2020.
(Continued)

*Primary Examiner* — Tarifur R Chowdhury
*Assistant Examiner* — Akbar H. Rizvi
(74) *Attorney, Agent, or Firm* — Shih IP Law Group, PLLC (57) ABSTRACT

Disclosed is a plane grating calibration system, comprising an optical subsystem, a frame, first vibration isolator, a vacuum chuck, a workpiece stage, second vibration isolator, a base platform and a controller; the optical subsystem is mounted on the frame, and the frame is isolated from vibration by the first vibration isolator; the vacuum chuck is rotatably mounted on the workpiece stage, the workpiece stage is positioned on the base platform, and the base platform is isolated from vibration by the second vibration
(Continued)

isolator. A displacement interferometer is integrated into the optical subsystem, and the entire optical subsystem adopts a method of sharing a light source, thereby avoiding the problems of low wavelength precision and poor coherence of separate light sources.

9 Claims, 4 Drawing Sheets

(51) Int. Cl.
    *G02B 5/18*     (2006.01)
    *G02B 7/00*     (2021.01)
    *G02B 27/10*     (2006.01)
    *G02B 27/28*     (2006.01)
    *G02B 27/30*     (2006.01)
    *G02F 1/11*     (2006.01)

(52) U.S. Cl.
    CPC .......... *G02B 7/003* (2013.01); *G02B 27/1006* (2013.01); *G02B 27/283* (2013.01); *G02B 27/30* (2013.01); *G02F 1/11* (2013.01)

(58) Field of Classification Search
    CPC .. G02B 27/1006; G02B 27/283; G02B 27/30; G02F 1/11
    See application file for complete search history.

(56) References Cited

U.S. PATENT DOCUMENTS

| | | | |
|---|---|---|---|
| 2011/0249270 A1 | 10/2011 | Ishizuka | |
| 2013/0170043 A1* | 7/2013 | Ko | G02B 5/1809 |
| | | | 359/571 |

FOREIGN PATENT DOCUMENTS

| | | |
|---|---|---|
| CN | 103673891 A | 3/2014 |
| CN | 103968757 A | 8/2014 |
| CN | 104345575 A | 2/2015 |
| CN | 104634283 A | 5/2015 |
| CN | 103673891 B | 5/2016 |
| CN | 103968757 B | 6/2017 |
| CN | 108801158 A | 11/2018 |
| CN | 110132550 A | 8/2019 |
| CN | 209485272 U | 10/2019 |
| CN | 108801158 B | 12/2019 |
| DE | 19536141 A1 | 4/1997 |
| EP | 0766068 A2 | 4/1997 |
| JP | 2007318119 A | 12/2007 |
| JP | 2010130624 A | 6/2010 |
| WO | 0135168 A1 | 5/2001 |

OTHER PUBLICATIONS

Lei-jie Wang, "A displacement measurement system for ultra-precision heterodyne Littrow grating interferometer" published on "Optics and Precision Engineering" on May 7, 2018.

Fang Wang, et al., "Grating heterodyne interferometer of high accuracy controlling photoelectric grating ruling engine" published on "Laser Technology" Oct. 31, 2008.

Bin Zhao, et al., "Research on Diffraction Grating Heterodyne Interference Measurement" published on "Jiangxi Science" vol. 21, No. 1, Mar. 31, 2003.

\* cited by examiner

PLANE GRATING CALIBRATION SYSTEM

This application claims the priority of Chinese Patent Application No. 201910405697.3, titled "PLANE GRATING CALIBRATION SYSTEM", filed on May 16, 2019, in the Chinese Intellectual Property Office, the whole contents of which are incorporated herein by reference.

TECHNICAL FIELD

The present disclosure relates to the technical field of optical metrology, and particularly, to a plane grating calibration system.

BACKGROUND ART

With the continuous development and innovation of optical technology, plane gratings, as an important component of many high-precision optical instruments, are used more and more widely. For example, they are used in scientific instruments such as grating ruler measuring instruments, plane grating spectrographs, grating monochromators, and large-scale lithography equipment. In addition to the above applications, high-precision plane gratings play an important role in "large optical systems", "inertial confinement nuclear fusion laser driving devices", etc. Manufacturing errors of the plane grating will affect the measurement accuracy of these precision equipment, and thus the calibration of the plane grating is of great significance to improve the measurement accuracy of plane grating-based optical instruments.

The U.S. Pat. No. 6,882,477 B1 of the Massachusetts Institute of Technology discloses a plane grating reading mode system for grating calibration. In the system, the light source of an optical subsystem and the light source of a displacement subsystem are configurated with separated light sources, and the coherence and wavelength stability of the light source of the optical subsystem is much lower than that of the light source of the displacement subsystem, which deteriorates the accuracy of plane grating calibration. In addition, the system adopts a method in which the optical subsystem and the workpiece stage are isolated from vibration by the same vibration isolation system. With such an integrated vibration isolation configuration, during the calibration, since the workpiece stage on which the plane grating is placed is moving, vibration generated by the workpiece stage, which is a moving member, is inevitably transmitted to and act on the optical subsystem, resulting in measurement errors and thereby deteriorating the accuracy of plane grating calibration.

SUMMARY OF THE INVENTION

In order to improve the accuracy of plane grating calibration, the present disclosure provides a plane grating calibration system, including an optical subsystem, a frame, first vibration isolator, a vacuum chuck, a workpiece stage, second vibration isolator, a base platform and a controller; the optical subsystem is mounted on the frame, and the frame is isolated from vibration by the first vibration isolator; the vacuum chuck is rotatably mounted on the workpiece stage, the workpiece stage is positioned on the base platform, and the base platform is isolated from vibration by the second vibration isolator.

In an embodiment, the controller includes a phase plate.

In an embodiment, the optical subsystem includes a dual-frequency laser, a first beam splitter, a first mirror, a first corner cube mirror, a second corner cube mirror, a first polarizing beam splitter, a phase modulator, a first phase meter, a second polarizing beam splitter, a second mirror, a third mirror, a first collimating lens, a second collimating lens, a first beam sampler, a second beam sampler, a second phase meter, and a displacement interferometer; the controller is respectively connected with the phase modulator, the first phase meter, the second phase meter and the displacement interferometer.

In an embodiment, a plane grating to be calibrated is mounted on the vacuum chuck, a dual-frequency orthogonal polarizing laser light emitted by the dual-frequency laser is divided into two beams of dual-frequency orthogonal polarizing laser light transmitted and reflected respectively after passing through the first beam splitter, the transmitted dual-frequency orthogonal polarization laser is split into transmitted light P and reflected light S by the first polarizing beam splitter after being reflected by the first mirror, the transmitted light P sequentially passes through the second mirror, the first collimating lens and the first beam sampler, the light P reflected by the first beam sampler transmits through the second polarizing beam splitter, the light P transmitted through the first beam sampler generates a 0-order diffracted light after passing through the plane grating, and the 0-order diffracted light is reflected by the second beam sampler; the light S reflected by the first polarizing beam splitter sequentially passes through the phase modulator, the third mirror, the second collimating lens and the second beam sampler, the light S reflected by the second beam sampler is reflected by the second polarizing beam splitter and the light P transmitted through the second polarizing beam splitter compose a first measuring light, and the first measuring light is input into the first phase meter; the light S transmitted through the second beam sampler is diffracted by the plane grating to generate a −1-order diffracted light, the −1-order diffracted light is reflected by the second beam sampler and the light P which is the 0-order diffracted light reflected by the second beam sampler compose a second measuring light, and the second measuring light is input into the second phase meter; the orthogonal polarization laser reflected by the first beam splitter is sequentially reflected by the first corner cube mirror and the second corner cube mirror and input into the displacement interferometer to be used for scanning the displacement of the workpiece stage.

In an embodiment, information about the first measuring light obtained by the first phase meter, the second measuring light obtained by the second phase meter and the workpiece stage movement obtained by the displacement interferometer are input into the controller, the dual-frequency laser emits a reference light to the phase plate of the controller, the controller generates a control command through calculating and processing and transmits the control command to the phase modulator, and the phase modulator modulates the laser beam according to the control command to correct an error in the calibration of the plane grating.

In an embodiment, the phase modulator may be an electro-optic modulator.

In an embodiment, the phase modulator includes a first acousto-optic modulator and a second acousto-optic modulator.

In an embodiment, the first acousto-optic modulator is disposed on the optical path of the light P transmitted through the first polarizing beam splitter, the transmitted light P generated by the first polarizing beam splitter is modulated by the first acousto-optic modulator and then travels to the second mirror.

In an embodiment, the second acousto-optic modulator is disposed on the optical path of the light S reflected by the first polarizing beam splitter, the light S reflected by the first polarizing beam splitter is modulated by the second acousto-optic modulator and then travels to the third mirror.

In an embodiment, the displacement interferometer includes an X-direction interferometer, a Y-direction interferometer, a third corner cube mirror and a second beam splitter.

In an embodiment, the laser input to the displacement interferometer is reflected to the second beam splitter by the third corner cube mirror, the transmitted light generated by the second beam splitter is used for scanning the displacement of the workpiece stage through the X-direction interferometer, and the reflected light generated by the second beam splitter is used for scanning the displacement the workpiece stage through the Y-direction interferometer.

In an embodiment, the plane grating is a one-dimensional plane grating, and the workpiece stage performs step motion along the X direction and scanning motion along the Y direction.

In an embodiment, the plane grating is a two-dimensional plane grating.

In an embodiment, the workpiece stage first performs step motion along the X direction and scanning motion along the Y direction to realize a first dimension calibration of the plane grating, then, the vacuum chuck drives the plane grating to rotate 90 degrees around the Z axis, and the workpiece stage subsequently performs step motion along the X direction and scanning motion along the Y direction to realize a second dimension calibration of the plane grating.

In an embodiment, the controller performs process on the information about the first measuring light input from the first phase meter and the information about the reference light according to the following formula:

$$\phi_1 = \frac{2\pi * PM_1}{F},$$

wherein $\phi_1$ represents the radian value of the phase change of the first measuring light, reflecting the phase change of the first measuring light caused by vibration, air disturbance, etc., $PM_1$ represents the value obtained by comparing the first measuring light with the reference light by using the phase plate, and F represents the resolution of the phase plate in the controller.

In an embodiment, the controller performs process on the information about the second measuring light input from the second phase meter and the information about the reference light according to the following formula:

$$\phi_2 = \frac{2\pi * PM_2}{F},$$

wherein $\phi_2$ represents the radian value of the phase change of the second measuring light, reflecting the phase change of the second measuring light caused by vibration, air disturbance, etc., and $PM_2$ represents the value obtained by comparing the second measuring light with the reference light by using the phase plate.

In an embodiment, a phase shift of the beam after diffracted by the plane grating is obtained by combining the radian value of the phase changes of the first measuring light and the second measuring light:

$$x_m = (\phi_1 + \phi_2) * \frac{\Lambda}{2\pi},$$

wherein $x_m$ represents the value of the phase shift of the beam after diffracted by the plane grating under the influence of vibration and air disturbance, and $\Lambda$ represents the period of the plane grating.

In an embodiment, the controller generates a control command according to the result of preceding process and transmits the control command to the phase modulator, and the phase modulator modulates the laser beam according to the control command to correct an error in the calibration of the plane grating caused by factors such as vibration and air disturbance.

In an embodiment, in the grating calibration process, the X-direction interferometer and the Y-direction interferometer respectively obtain the displacements of the workpiece stage in the X and Y directions in real time, and input them into the controller, and then the controller performs process according to the following formula:

$$x_e = [\cos \alpha(x_r - x) + \sin \alpha(y_r - y)],$$

wherein $x_e$ represents the phase shift of the beam after diffracted by the plane grating caused by a motion error of the workpiece stage, $\alpha$ represents the deflection angle of the grating line in the coordinate system of the workpiece stage, $x_r$ represents the reference ideal displacement of the workpiece stage in the x-axis direction in the coordinate system, $y_r$ represents the reference ideal displacement of the workpiece stage in the y-axis direction in the coordinate system, x represents the actually measured displacement in the x-axis direction of the interferometer, and y represents the actually measured displacement in the y-axis direction of the interferometer.

In an embodiment, a total phase shift of the beam after diffracted by the plane grating is obtained as below:

$$x_{fle} = x_m - x_e,$$

wherein $x_{fle}$ represents the total phase shift of the beam after diffracted by the plane grating.

In an embodiment, the controller generates a control command according to the result of preceding process and transmits the control command to the phase modulator, and the phase modulator modulates the laser beam according to the control command to correct an error in the calibration of the plane grating caused by factors such as vibration, air disturbance, and the motion error of the workpiece stage.

In the grating calibration process, the X-direction interferometer and the Y-direction interferometer respectively obtain the displacements of the workpiece stage in the X and Y directions in real time, and input them into the controller. After calculation and processing by the controller, the phase shift $x_e$ of the beam after diffracted by the plane grating caused by a motion error of the workpiece stage relative to the ideal position is obtained. The controller generates a control command according to the calculation result of $x_e$ and transmits the control command to the phase modulator, and the phase modulator modulates the laser beam according to the control command to correct an error in the calibration of the plane grating caused by the motion error of the workpiece stage.

The light source of the displacement interferometer (corresponding to the displacement subsystem in prior art) of the plane grating calibration system of the present disclosure is a dual-frequency orthogonal polarization laser reflected by a first beam splitter, a first corner cube mirror and a second corner cube mirror, i.e., the entire optical subsystem of the present disclosure adopts a method of sharing a light source. Therefore, the displacement interferometer of the present disclosure may be integrated into the optical subsystem. However, the light source of the optical subsystem and the light source of the displacement subsystem are not the same one in the calibration system of prior art, i.e., they are two separate components. The optical subsystem of the present disclosure which adopts a single light source avoids the problems of low wavelength precision and poor coherence of separate light sources of the optical subsystem in the prior ar. In addition, according to the present disclosure, the optical subsystem and the workpiece stage in the calibration system of the present disclosure are provided with individual vibration isolators to prevent vibration of the workpiece stage from being transferred to the optical subsystem, so that an error generated due to the vibration of the optical subsystem is minimized, thereby improving the precision of calibration of the plane grating.

In the drawings:
1—dual-frequency laser;
2—first beam splitter;
3—first mirror;
4—first corner cube mirror;
5—second corner cube mirror;
6—first polarizing beam splitter;
7—phase modulator;
8—first phase meter;
9—second polarizing beam splitter;
10—second mirror;
11—third mirror;
12—first collimating lens;
13—second collimating lens;
14—first beam sampler;
15—second beam sampler;
16—second phase meter;
17—displacement interferometer;
18—workpiece stage;
19—vacuum chuck;
20—base platform;
21—second vibration isolator;
22—first vibration isolator;
23—controller;
24—frame;
25—plane grating;
26—X-direction interferometer;
27—Y-direction interferometer;
28—third corner cube mirror;
29—second beam splitter;
71—first acousto-optic modulator; and
72—second acousto-optic modulator.

DETAILED DESCRIPTION OF THE EMBODIMENTS

In order to further illustrate the technical means adopted by the present disclosure to is solve the technical problems and the technical effects achieved thereof, the present disclosure will be further described in detail below in conjunction with the accompanying drawings and specific embodiments. It should be noted that the drawings are schematic and are not drawn completely in accordance with size or scale, so the accompanying drawings and specific embodiments are not intended to limit the scope of the present disclosure.

Figure 1:
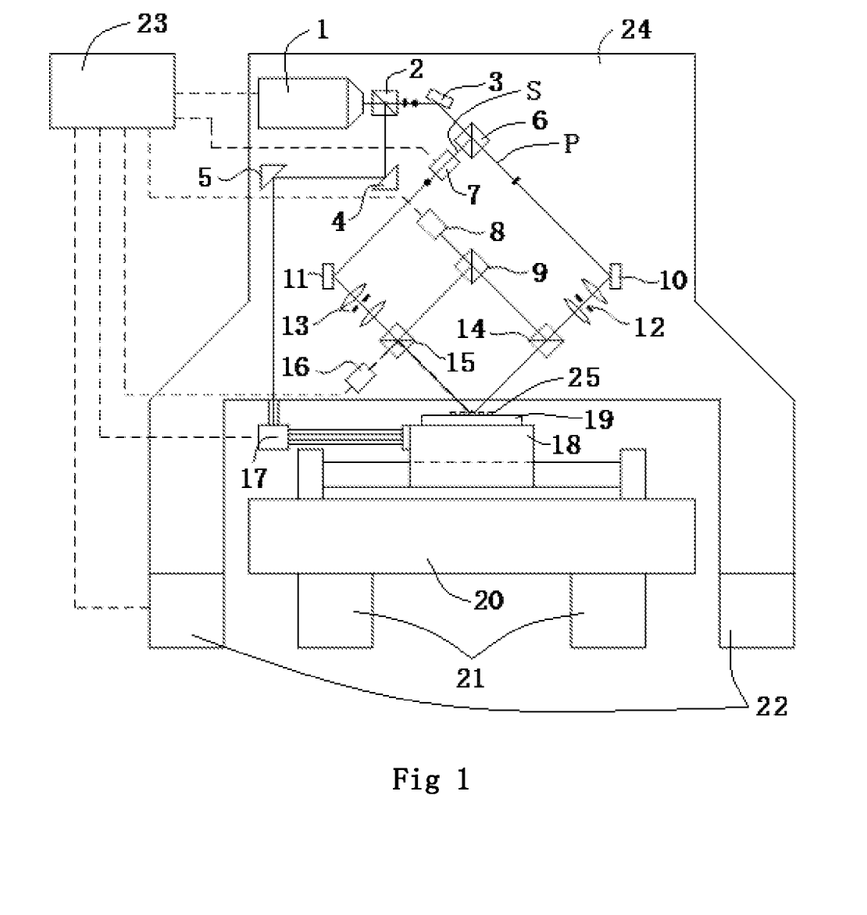
FIG. 1 is a schematic view of an embodiment of the plane grating calibration system of the present disclosure.

As an optional embodiment of the plane grating calibration system, the system illustrated in FIG. 1 includes an optical subsystem, a frame 24, first vibration isolator 22, a vacuum chuck 19, a workpiece stage 18, second vibration isolator 21, a base platform 20 and a controller 23. The optical subsystem includes a dual-frequency laser 1, a first beam splitter 2, a first mirror 3, a first corner cube mirror 4, a second corner cube mirror 5, a first polarizing beam splitter 6, a phase modulator 7, a first phase meter 8, a second polarizing beam splitter 9, a second mirror 10, a third mirror 11, a first collimating lens 12, a second collimating lens 13, a first beam sampler 14, a second beam sampler 15, a second phase meter 16 and a displacement interferometer 17; the optical subsystem is mounted on the frame 24, and the frame 24 is mounted on the first vibration isolator 22; the vacuum chuck 19 is rotatably mounted on the workpiece stage 18, the workpiece stage 18 is positioned on the base platform 20, and the base platform 20 is mounted on the second vibration isolator 21; the controller 23 is respectively connected with the phase modulator 7, the first phase meter 8, the second phase meter 16 and the displacement interferometer 17, the controller includes a phase plate (not shown), and the phase plate may convert or compare input optical signals with reference signals.

The plane grating 25 to be calibrated is mounted on the vacuum chuck 19, a dual-frequency orthogonal polarizing laser light emitted by the dual-frequency laser 1 is divided into two beams (transmitted beam and reflected beam) of dual-frequency orthogonal polarizing laser light by the first beam splitter 2, the transmitted dual-frequency orthogonal polarization laser is split into transmitted light P and reflected light S by the first polarizing beam splitter 6 after being reflected by the first mirror 3, the transmitted light P sequentially passes through the second mirror 10, the first collimating lens 12 and the first beam sampler 14, the light P reflected by the first beam sampler 14 transmits through the second polarizing beam splitter 9, the light P transmitted through the first beam sampler 14 generates a 0-order diffracted light after passing through the plane grating 25, and the 0-order diffracted light is reflected by the second beam sampler 15; the phase modulator 7 in the embodiment may be an electro-optic modulator, the light S reflected by the first polarizing beam splitter 6 sequentially passes through the phase modulator 7, the third mirror 11, the second collimating lens 13 and the second beam sampler 15, the light S reflected by the second beam sampler 15 is reflected by the second polarizing beam splitter 9 and the light P transmitted through the second polarizing beam splitter 9 compose a first measuring light, and the first measuring light is input into the first phase meter 8; the light S transmitted through the second beam sampler 15 is diffracted by the plane grating 25 to generate a −1-order diffracted light, the −1-order diffracted light is reflected by the second beam sampler 15 and the light P which is the 0-order diffracted light reflected by the second beam sampler 15 compose a second measuring light, and the second measuring light is input into the second phase meter 16; the dual-frequency orthogonal polarizing laser light emitted by the dual-frequency laser 1 is reflected by the first beam splitter 2, and the reflected orthogonal polarization laser light is sequentially reflected by the first corner cube mirror 4 and the second corner cube mirror 5 and input into the displacement interferometer 17 to be used for scanning the displacement of the workpiece stage 18.

Information about the first measuring light obtained by the first phase meter 8, the second measuring light obtained by the second phase meter 16 and the displacement of the workpiece stage obtained by the displacement interferometer 17 are input into the controller 23, the dual-frequency laser 1 emits a reference light to the phase plate of the controller 23, and the controller 23 performs process.

The controller performs process on the information about the first measuring light input from the first phase meter and the information about the reference light according to the following formula:

$$\phi_1 = \frac{2\pi * PM_1}{F},$$

wherein $\phi_1$ represents the radian value of the phase change of the first measuring light, reflecting the phase change of the first measuring light caused by vibration, air disturbance, etc., $PM_1$ represents the value obtained by comparing the first measuring light with the reference light by using the phase plate, and F represents the resolution of the phase plate in the controller.

Meanwhile, the controller performs process on the information about the second measuring light input from the second phase meter and the information about the reference light according to the following formula:

$$\phi_2 = \frac{2\pi * PM_2}{F},$$

wherein $\phi_2$ represents the radian value of the phase change of the second measuring light, reflecting the phase change of the second measuring light caused by vibration, air disturbance, etc., and $PM_2$ represents the value obtained by comparing the second measuring light with the reference light by using the phase plate.

A phase shift of the beam after diffracted by the plane grating is obtained by combining the radian value of the phase changes of the first measuring light and the second measuring light:

$$x_m = (\phi_1 + \phi_2) * \frac{\Lambda}{2\pi},$$

wherein $x_m$ represents the value of the phase shift of the beam after diffracted by the plane grating under the influence of vibration, air disturbance, etc., and Λ represents the period of the plane grating.

In the grating calibration process, the X-direction interferometer and the Y-direction interferometer respectively obtain the displacements of the workpiece stage in the X and Y directions in real time, and input them into the controller, and then the controller performs process according to the following formula:

$$x_e = [\cos \alpha(x_r - x) + \sin \alpha(y_r - y)],$$

wherein $x_e$ represents the phase shift of the beam after diffracted by the plane grating caused by the motion error of the workpiece stage, α represents the deflection angle of the grating line in the coordinate system of the workpiece stage, $x_r$ represents the reference ideal displacement of the workpiece stage in the x-axis direction in the coordinate system, $y_r$ represents the reference ideal displacement of the workpiece stage in the y-axis direction in the coordinate system, x represents the actually measured displacement in the x-axis direction of the interferometer, and y represents the actually measured displacement in the y-axis direction of the interferometer.

A total phase shift of the beam after diffracted by the plane grating is obtained as below:

$$x_{fle} = x_m - x_e,$$

wherein $x_{fle}$ represents the total phase shift of the beam after diffracted by the plane grating.

The controller 23 generates a control command according to the result of preceding process and transmits the control command to the phase modulator 7, and the phase modulator 7 modulates the laser beam according to the control command to correct errors in the calibration of the plane grating 25 caused by factors such as vibration, air disturbance, and the motion error of the workpiece stage.

The embodiment has the following beneficial effects: the motion error of the workpiece stage can be measured by the displacement interferometer, the influence of vibration, air flow and refractive index change on the laser can be calculated on the basis of the measurement signal of the first phase meter, the instability of the laser can be calculated on the basis of the measurement signal of the second phase meter, the measurement information about the displacement interferometer, the first phase meter and the second phase meter are input into the controller, and then the controller controls the phase modulator to modulate the laser beam after calculation and processing, so as to suppress the resulting errors; and both the light source for calibration and the light source of the workpiece stage displacement measurement interferometer are emitted from the dual-frequency laser, which avoids an error caused by difference of light sources, and thus the precision of calibration of the plane grating is further improved. The system adopts a phase modulator to shorten the optical path, reduces the complexity of the optical subsystem, reduces the size of the system, and reduces the power demand of the optical subsystem for the dual-frequency laser.

In the plane grating calibration system of the present disclosure, the optical subsystem and the workpiece stage are provided with individual vibration isolators for the two subsystems to prevent vibration of the workpiece stage movement from being transferred to the optical subsystem for measurement, improving the stability of the optical subsystem. Therefore, by relatively independent vibration isolation for the optical subsystem and the workpiece stage, the plane grating calibration system of the present disclosure minimizes adverse influence of vibration caused by the movement of the workpiece stage on the optical subsystem, and improves the precision of calibration of the plane grating.

Figure 2:
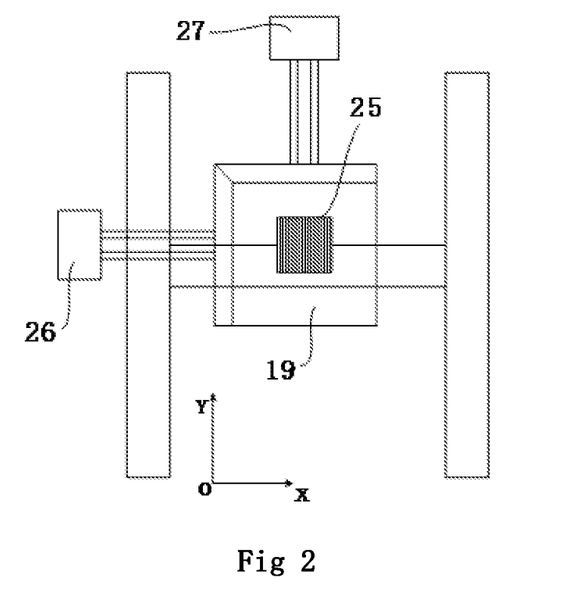
FIG. 2 is a schematic plan view of the displacement interferometer scanning the workpiece stage.
Figure 4:
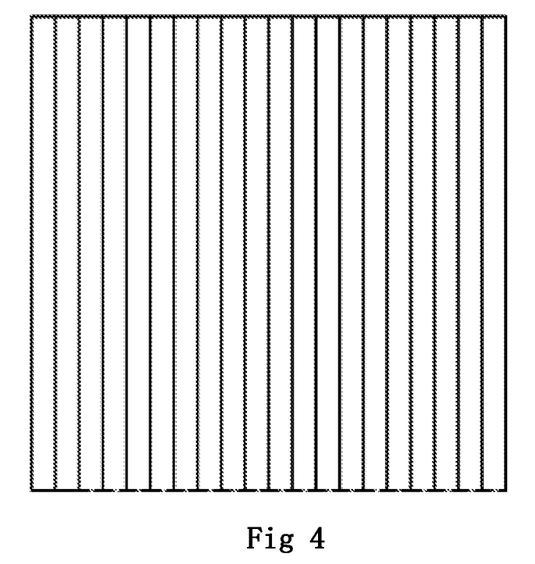
FIG. 4 is a schematic view of a one-dimensional plane grating.
Figure 5:
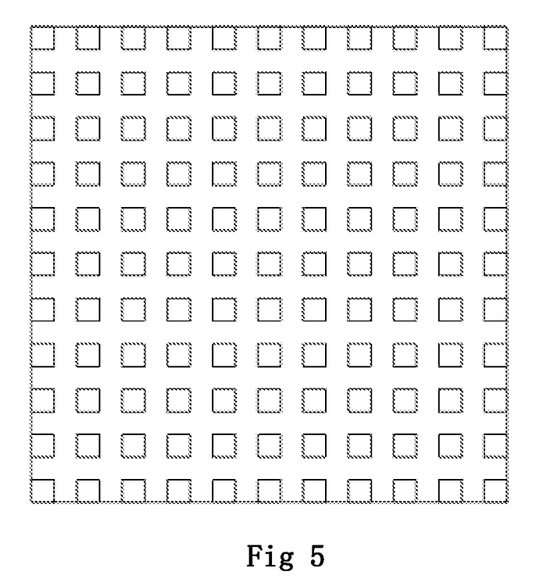
FIG. 5 is a schematic view of a two-dimensional plane grating.

FIG. 2 illustrates an example of the displacement interferometer scanning the workpiece stage. The displacement interferometer includes an X-direction interferometer 26 and a Y-direction interferometer 27. The plane grating 25 is positioned on the vacuum chuck 19, the vacuum chuck 19 is mounted on the workpiece stage, the X-direction interferometer 26 measures the movement of the workpiece stage in the X direction, and the Y-direction interferometer 27 measures the movement of the workpiece stage in the Y direction, so as to realize calibration of a one-dimensional plane grating as illustrated in FIG. 4. In the case of a two-dimensional plane grating, after the workpiece stage performs step motion along the X direction and scanning motion along the Y direction, the vacuum chuck 19 rotates 90 degrees around the Z axis, i.e., the vacuum chuck 19 drives the two-dimensional plane grating to rotate 90 degrees, and then the workpiece stage performs step motion along the X direction and scanning motion along the Y direction to realize calibration of the two-dimensional plane grating as illustrated in FIG. 5.

Figure 3:
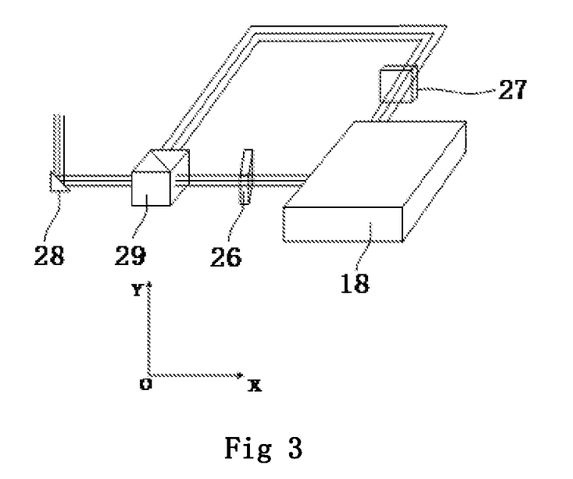
FIG. 3 is a schematic view of the optical path of the displacement interferometer.

FIG. 3 is a schematic view of the optical path of the displacement interferometer. The displacement interferometer includes an X-direction interferometer 26, a Y-direction interferometer 27, a third corner cube mirror 28 and a second beam splitter 29, and the laser input to the displacement interferometer is reflected to the second beam splitter 29 by the third corner cube mirror 28, the transmitted light generated by the second beam splitter 29 is used for scanning the displacement of the workpiece stage 18 through the X-direction interferometer 26, and the reflected light generated by the second beam splitter 29 is used for scanning the displacement of the workpiece stage 18 through the Y-direction interferometer 27.

Figure 6:
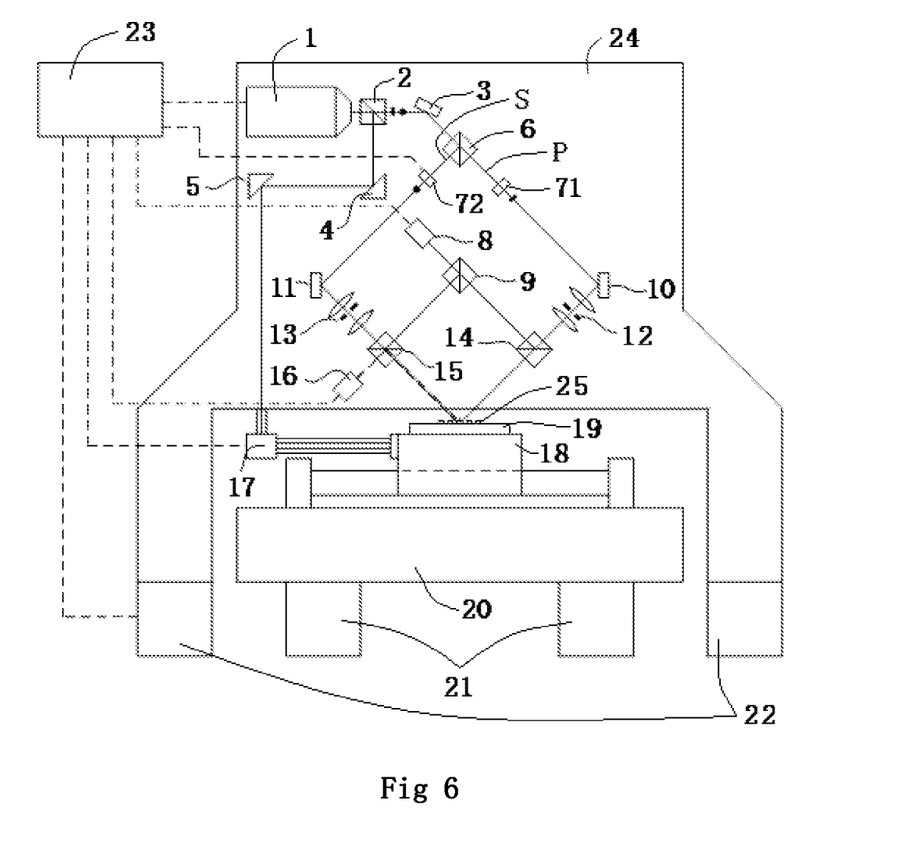
FIG. 6 is a schematic view of another embodiment of the plane grating calibration system.

FIG. 6 illustrates an optional embodiment of the plane grating calibration system, which is different from the embodiment as illustrated in FIG. 1 in that the phase modulator 7 is not an electro-optic modulator but two acousto-optic modulators, i.e., a first acousto-optic modulator 71 and a second acousto-optic modulator 72. The first acousto-optic modulator 71 is disposed on the optical path of light P transmitted through the first polarizing beam splitter 6, the transmitted light P generated by the first polarizing beam splitter 6 is modulated by the first acousto-optic modulator 71 and then travels to the second mirror 10. The second acousto-optic modulator 72 is disposed on the optical path of light S reflected by the first polarizing beam splitter 6, the reflected light S generated by the first polarizing beam splitter 6 is modulated by the second acousto-optic modulator 72 and then travels to the third mirror 11.

It should be noted that all the parameters mentioned above may have units, and except particularly specified, units of them are international standard units.

The present disclosure may also have various other embodiments, and various corresponding changes and modifications can be made by those skilled in the art according to the present disclosure without departing from the spirit and essence of the present disclosure, but these corresponding changes and modifications should be within the scope of the claims of the present disclosure.

What is claimed is:

1. A plane grating calibration system, comprising an optical subsystem, a frame, a first vibration isolator, a vacuum chuck, a workpiece stage, a second vibration isolator, a base platform and a controller, wherein the optical subsystem is mounted on the frame, the frame is isolated from vibration by the first vibration isolator, the vacuum chuck is rotatably mounted on the workpiece stage, the workpiece stage is positioned on the base platform, and the base platform is isolated from vibration by the second vibration isolator, wherein the controller comprises a phase plate, wherein the optical subsystem comprises a dual-frequency laser, a first beam splitter, a first mirror, a first corner cube mirror, a second corner cube mirror, a first polarizing beam splitter, a phase modulator, a first phase meter, a second polarizing beam splitter, a second mirror, a third mirror, a first collimating lens, a second collimating lens, a first beam sampler, a second beam sampler, a second phase meter, and a displacement interferometer;

wherein the controller is respectively connected with the phase modulator, the first phase meter, the second phase meter and the displacement interferometer; a plane grating to be calibrated is mounted on the vacuum chuck, a dual-frequency orthogonal polarizing laser light emitted by the dual-frequency laser is divided into two beams of dual-frequency orthogonal polarizing laser light transmitted and reflected respectively after passing through the first beam splitter, the transmitted dual-frequency orthogonal polarization laser is split into transmitted light P and reflected light S by the first polarizing beam splitter after being reflected by the first mirror, the transmitted light P sequentially passes through the second mirror, the first collimating lens and the first beam sampler, the light P reflected by the first beam sampler transmits through the second polarizing beam splitter, the light P transmitted through the first beam sampler generates a 0-order diffracted light after passing through the plane grating, and the 0-order diffracted light is reflected by the second beam sampler; the light S reflected by the first polarizing beam splitter sequentially passes through the phase modulator, the third mirror, the second collimating lens and the second beam sampler, the light S reflected by the second beam sampler is reflected by the second polarizing beam splitter and the light P transmitted through the second polarizing beam splitter compose a first measuring light, and the first measuring light is input into the first phase meter; the light S transmitted through the second beam sampler is diffracted by the plane grating to generate a −1-order diffracted light, the −1-order diffracted light is reflected by the second beam sampler and the light P which is the 0-order diffracted light reflected by the second beam sampler compose a second measuring light, and the second measuring light is input into the second phase meter; the orthogonal polarization laser reflected by the first beam splitter is sequentially reflected by the first corner cube mirror and the second corner cube mirror and input into the displacement interferometer to be used for scanning a displacement of the workpiece stage; and wherein information about the first measuring light obtained by the first phase meter, the second measuring light obtained by the second phase meter and the displacement of the workpiece stage obtained by the displacement interferometer are input into the controller, the dual-frequency laser emits a reference light to the phase plate of the controller, the controller generates a control command through calculating and processing and transmits the control command to the phase modulator, and the phase modulator modulates the laser beam according to the control command to correct an error in the calibration of the plane grating.

2. The plane grating calibration system of claim 1, wherein the phase modulator is an electro-optic modulator.

3. The plane grating calibration system of claim 1, wherein the phase modulator comprises a first acousto-optic modulator and a second acousto-optic modulator,
wherein the first acousto-optic modulator is disposed on an optical path of the light P transmitted through the first polarizing beam splitter, the transmitted light P generated by the first polarizing beam splitter is modulated by the first acousto-optic modulator and then travels to the second mirror; and
wherein the second acousto-optic modulator is disposed on an optical path of the light S reflected by the first polarizing beam splitter, the light S reflected by the first polarizing beam splitter is modulated by the second acousto-optic modulator and then travels to the third mirror.

4. The plane grating calibration system of claim 1, wherein the displacement interferometer comprises an X-direction interferometer, a Y-direction interferometer, a third corner cube mirror and a second beam splitter, and
wherein the laser input to the displacement interferometer is reflected to the second beam splitter by the third corner cube mirror, the transmitted light generated by the second beam splitter is used for scanning a displacement of the workpiece stage through the X-direction interferometer, and the reflected light generated by the second beam splitter is used for scanning a displacement of the workpiece stage through the Y-direction interferometer.

5. The plane grating calibration system of claim 4, wherein the plane grating is a one-dimensional plane grating, and the workpiece stage performs step motion along an X direction and scanning motion along an Y direction.

6. The plane grating calibration system of claim 4, wherein the plane grating is a two-dimensional plane grating, and
wherein the workpiece stage first performs step motion along the X direction and scanning motion along the Y direction to realize a first dimension calibration of the plane grating, then, the vacuum chuck drives the plane grating to rotate 90 degrees around a Z axis, and the workpiece stage subsequently performs step motion along the X direction and scanning motion along the Y direction to realize a second dimension calibration of the plane grating.

7. The plane grating calibration system of claim 4, wherein the controller performs process on the information about the first measuring light input from the first phase meter and the information about the reference light according to the following formula:

$$\phi_1 = \frac{2\pi * PM_1}{F},$$

wherein $\phi_1$ represents a radian value of a phase change of the first measuring light, $PM_1$ represents a value obtained by comparing the first measuring light with the reference light by using the phase plate; and F represents the resolution of the phase plate in the controller,
wherein the controller performs process on the information about the second measuring light input from the second phase meter and the information about the reference light according to the following formula:

$$\phi_2 = \frac{2\pi * PM_2}{F},$$

wherein $\phi_2$ represents a radian value of a phase change of the second measuring light, and $PM_2$ represents a value obtained by comparing the second measuring light with the reference light by using the phase plate,
wherein a phase shift of the beam after diffracted by the plane grating is obtained by combining the radian value of the phase changes of the first measuring light and the second measuring light:

$$x_m = (\phi_1 + \phi_2) * \frac{\Lambda}{2\pi},$$

wherein $x_m$ represents a value of the phase shift of the beam after diffracted by the plane grating under the influence of vibration and air disturbance, and $\Lambda$ represents a period of the plane grating, and
wherein the controller generates a control command according to a result of preceding process and transmits the control command to the phase modulator, and the phase modulator modulates the laser beam according to the control command to correct an error in the calibration of the plane grating.

8. The plane grating calibration system of claim 4, wherein, in the grating calibration process, the X-direction interferometer and the Y-direction interferometer respectively obtain the displacements of the workpiece stage in the X and Y directions in real time, and input them into the controller, and then the controller performs process according to the following formula:

$x_e=[\cos \alpha(x_r-x)+\sin \alpha(y_r-y)]$, wherein $x_e$ represents a phase shift of the beam after diffracted by the plane grating caused by a motion error of the workpiece stage, $\alpha$ represents a deflection angle of the grating line in a coordinate system of the workpiece stage, $x_r$ represents a reference ideal displacement of the workpiece stage in an x-axis direction in the coordinate system, $y_r$ represents a reference ideal displacement of the workpiece stage in a y-axis direction in the coordinate system, x represents an actually measured displacement in the x-axis direction of the interferometer, and y represents an actually measured displacement in the y-axis direction of the interferometer, and
wherein the controller generates a control command according to a result of preceding process and transmits the control command to the phase modulator, and the phase modulator modulates the laser beam according to the control command to correct an error in the calibration of the plane grating caused by the motion error of the workpiece stage.

9. The plane grating calibration system of claim 7, wherein, in the grating calibration process, the X-direction interferometer and the Y-direction interferometer respectively obtain the displacements of the workpiece stage in X and Y directions in real time, and input them into the controller, and then the controller performs process according to the following formula:

$x_e=[\cos \alpha(x_r-x)+\sin \alpha(y_r-y)]$ wherein $x_e$ represents a phase shift of the beam after diffracted by the plane grating caused by a motion error of the workpiece stage, a represents a deflection angle of the grating line in the coordinate system of the workpiece stage, $x_r$ represents a reference ideal displacement of the workpiece stage in the x-axis direction in the coordinate system, $y_r$ represents a reference ideal displacement of the workpiece stage in the y-axis direction in the coordinate system, x represents an actually measured displacement in the x-axis direction of the interferometer, and y represents an actually measured displacement in the y-axis direction of the interferometer, wherein a total phase shift of the beam after diffracted by the plane grating is obtained as below:

$$x_{fle} = x_m - x_e,$$

wherein $x_{fle}$ represents a total phase shift of the beam after diffracted by the plane grating, and wherein the controller generates a control command according to a result of preceding process and transmits the control command to the phase modulator, and the phase modulator modulates the laser beam according to the control command to correct an error in the calibration of the plane grating.

\* \* \* \* \*